Nov. 1, 1966    H. R. LOHRENTZ    3,282,408
COMBINATION AUGER AND FOLD-BACK FINGER FEEDER
Filed Nov. 9, 1964    2 Sheets-Sheet 1
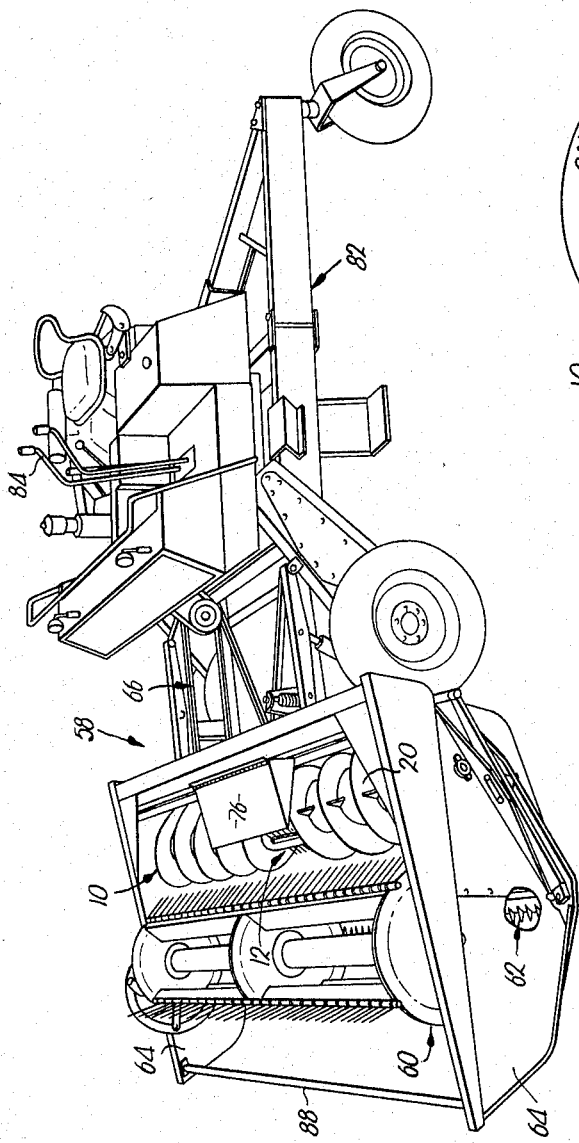
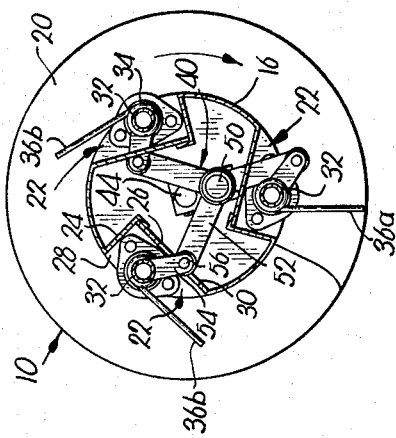
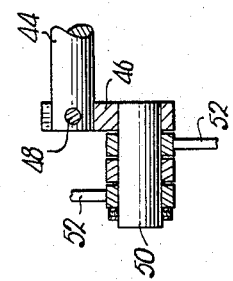
INVENTOR.
Howard R. Lohrentz
BY
Hovey, Schmidt, Johnson & Hovey
ATTORNEYS.

Nov. 1, 1966     H. R. LOHRENTZ     3,282,408
COMBINATION AUGER AND FOLD-BACK FINGER FEEDER
Filed Nov. 9, 1964     2 Sheets-Sheet 2
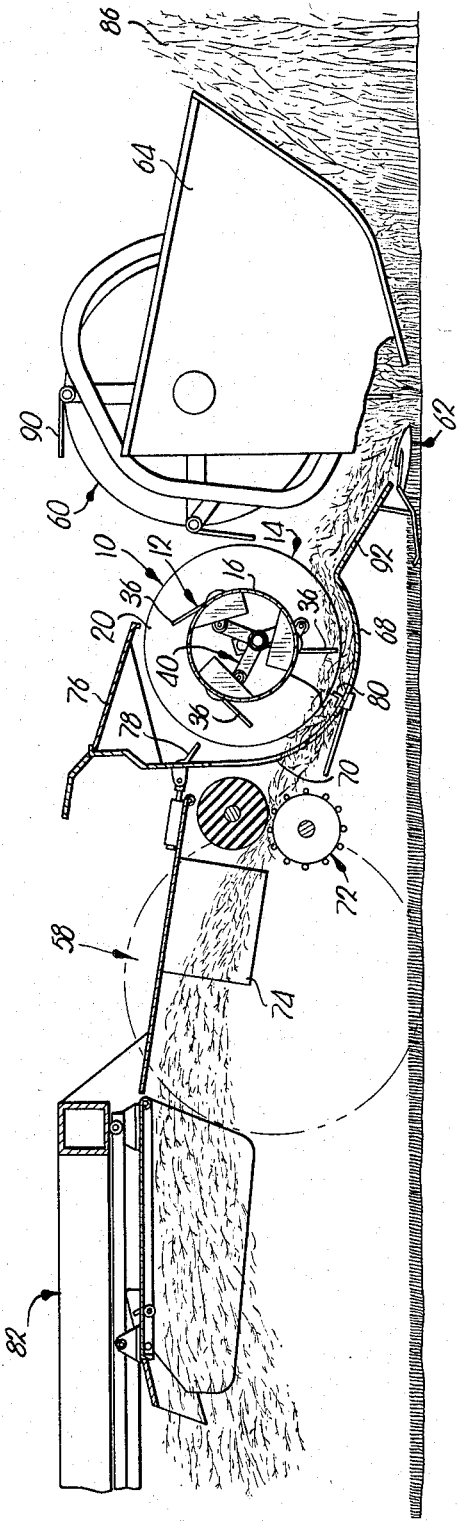
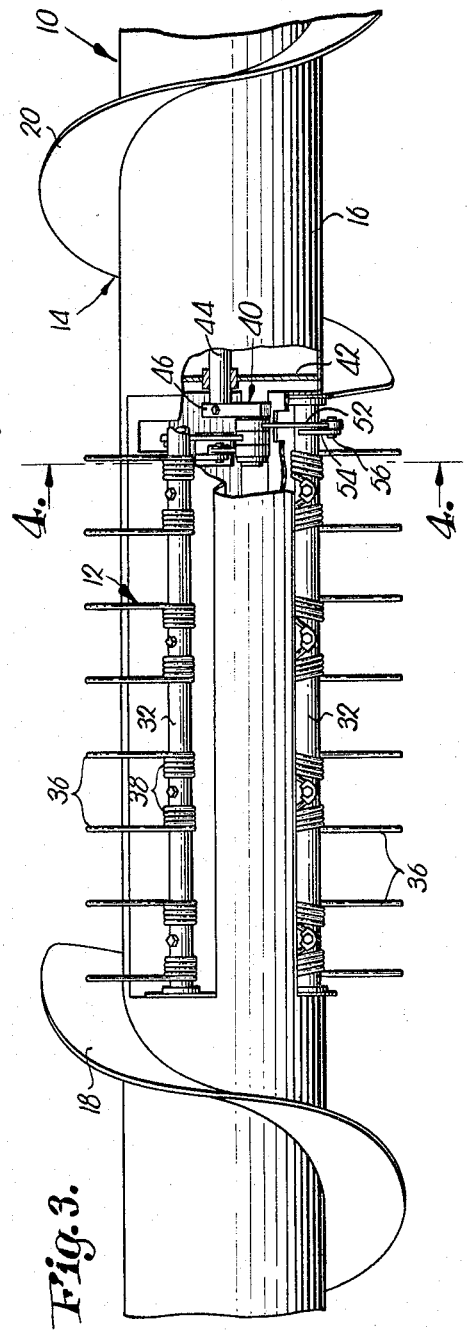
INVENTOR.
Howard R. Lohrentz
BY
*Hovey, Schmidt, Johnson & Hovey*
ATTORNEYS.

United States Patent Office 3,282,408
Patented Nov. 1, 1966

3,282,408
COMBINATION AUGER AND FOLD-BACK FINGER FEEDER
Howard R. Lohrentz, Hesston, Kans., assignor to Hesston Manufacturing Company, Inc., Hesston, Kans., a corporation of Kansas
Filed Nov. 9, 1964, Ser. No. 409,666
1 Claim. (Cl. 198—211)

This invention relates to farm machinery, and more particularly to harvesting implements, the primary object being to provide improved structure for handling the crop cut by the implement.

It is the most important object of the present invention to provide a conveyor for a harvester that combines auger and flexible tine principles in a novel manner to more effectively remove the cut crop from the cutting zone and advance it toward a discharge area remote from cutting mechanism.

Another important object of the instant invention is the provision of materials-handling structure of the aforementioned character that results in more uniform feeding, without bunching or wrap-around, than has heretofore been possible through use of conventional conveyors in this field.

A further object of my present invention is to utilize retractable tines in a novel arrangement such that they act as impellers to project the crop toward the discharge area after the crop is received thereby from the augers, which augers, in turn, serve to collect the crop and deliver it to the tines in a manner to cause them to be most effective in their impelling primary functions.

Still another object of the instant invention is to arrange and swingably mount the impeller tines on the rotor between a pair of opposed, oppositely-acting auger sections carried by the rotor, such that the tines extend into and effectively rake the crop collected by the augers laterally of the rotor at the proper time and point in the cycle of rotation, yet yield or retract away from and smoothly pull out of the collected crop immediately upon completion of their function of impelling or force-feeding the crop toward or into a conditioner or other crop-receiving structure, or point of discharge.

In the drawings:

FIGURE 1 is a top, left-hand perspective view of a harvester illustrating the combination auger and fold-back finger feeder of the instant invention;

FIG. 2 is an enlarged, fragmentary, vertical cross-sectional view, taken fore and aft of the machine, partly in elevation and partially schematic;

FIG. 3 is a fragmentary, front elevational view, still further enlarged, of the materials-handling assembly, parts being broken away and in section to illustrate details of construction;

FIG. 4 is a cross-sectional view taken along line 4—4 of FIG. 3;

FIG. 5 is an enlarged, fragmentary, detailed view similar to a portion of FIG. 3, partly in section.

The present invention provides an improved crop conveyor for a harvester, such as a windrowing machine, and includes an auger unit rotatable about its longitudinal axis and provided with a pair of spaced sections for directing a cut crop inwardly from the ends of a trough over which the auger sections are disposed. The crop is moved by the auger sections into alignment with a central opening in the back of the trough, and a swingable, tined impeller is provided between the inner extremities of the auger sections for projecting and force-feeding the crop rearwardly, i.e., laterally of the trough through its discharge opening.

The impeller includes a number of circumferentially spaced shafts, each having a plurality of spaced, laterally extending tines or fingers. The shafts are mounted on the auger unit or rotor for oscillation about axes parallel to the axis of rotation so as to swing the tines from retracted or fold-back positions proximal to the inner edges of the auger sections to crop-engaging positions extending outwardly of the auger unit.

A crank, provided for each tine shaft respectively, pivotally couples the latter with a stub shaft within a hollow interior of the auger unit so that the tines swing into their crop-engaging positions as they approach the discharge opening, and swing into their retracted positions after they have impelled the crop toward and through the discharge opening. Thus, the tines are caused to clear adjacent structure and, as a result, the trough may be disposed closer to a conditioner or other receiving structure, as desired, disposed in alignment with and exteriorly of the discharge opening.

A crop conveyor 10, having improved impeller structure 12 thereon, includes an auger unit or elongated rotor 14 having a tubular base or core 16 and a pair of helical auger sections 18 and 20 disposed on the outer surface of base 16 and disposed on opposed sides of impeller structure 12. Although auger unit 14 is not shown in its entirety in FIG. 3, it is to be noted that auger sections 18 and 20 extend inwardly from the ends of base 16. Section 18 is disposed on base 16 in a reverse rotative sense with respect to section 20 so that, as base 16 is rotated in one direction about its longitudinal axis, a crop disposed within a trough beneath auger unit 14 will be moved inwardly from the ends of the trough toward impeller structure 12.

As shown in FIG. 4, base 16 is provided with a number of circumferentially spaced, longitudinally extending recesses 22 between the inner extremities of sections 18 and 20, the longitudinal portion of each recess being defined by a pair of relatively perpendicular walls 24 and 26 extending inwardly from the outer periphery of base 16. A pair of end walls 28 are provided for each recess 22 respectively, walls 28 being coupled with walls 24 and 26 to join the end edges thereof to the outer periphery of base 16. Each wall 24 is provided with a slot 30 adjacent one end thereof for a purpose hereinafter described.

Impeller structure 12 includes a shaft 32 for each recess 22 respectively. Each shaft 32 is mounted at the ends thereof by bearings 34 on the corresponding end walls 28 for oscillatory movement about an axis parallel to the longitudinal axis of base 16, the axes of shafts 32 being within the outer periphery of base 16 as shown in FIG. 4. A plurality of spring tines 36 are secured to and extend laterally from each shaft 32 respectively. Tines 36 are of the type having a coil spring 38 disposed about and secured to the corresponding shaft 32 to provide a restoring force for the tine when the same is deflected.

Crank means 40 is coupled with shafts 32 to cause the latter to oscillate with respect to auger unit 14 and swing tines 36 from retracted positions to a crop-engaging position, and back to their retracted positions. A partition 42 within base 16 rotatably receives a longitudinally extending shaft 44 having an arm 46 rigid to and extending laterally from the inner end thereof. A pin 48 (FIG. 5) rigidly interconnects arm 46 to shaft 44. Shaft 44 is coincident with the longitudinal axis of base 16 so that the outer end of arm 46 is spaced from the center of auger unit 14.

A stub shaft 50 is rigid to and extends laterally from the outer end of arm 46 in parallelism with shaft 44. A crank for each shaft 32 is pivotally secured to and extends laterally from stub shaft 50. Each crank includes a first link 52 rotatably mounted at one end thereof on shaft 50 and pivotally secured at the opposite end to a second link 54 by means of a pin 56. Link 54 is rigid to its corresponding shaft 32 to rotate the latter in response to movements of first link 52 relative to second link 54. Slots 30 are large enough to allow movement of either of the links 52 and 54 and their pin therethrough as the same are shifted with respect to stub shaft 50 upon rotation of auger unit 14.

As shown in FIG. 4, a row of tines 63a are disposed in crop-engaging positions, whereas a pair of rows 36b are disposed in retracted positions substantially tangential to the outer periphery of base 16. Tines 36a extend outwardly of base 16 and, except for being tangential to the outer surface of shaft 32, would normally be substantially radial to auger unit 14. In these positions, the ends of tines 36a are in substantial alignment with the outer peripheral edges of sections 18 and 20.

As auger unit 14 continues to rotate, the outer end of link 52 corresponding to tines 36a will be shifted radially inwardly under the influence of stub shaft 50 so that tines 36a will move from their crop-engaging positions shown in FIG. 4, to their retracted positions. Tines 36b will, of course, move toward and into their crop-engaging positions as auger unit 14 rotates.

In use, conveyor 10 is mounted in any suitable manner, such as on a windrowing machine of the type having a rotatable, tine-carrying reel 60 and a cutter bar 62 below reel 60. Conveyor 10 is mounted at the forward end of the machine so that auger unit 14 spans the distance between a pair of side supports 64 and is rotatable with respect thereto by means of suitable bearing structure (not shown).

Shaft 44 is fixed to one support 64 so that auger unit 14 will rotate with respect to shaft 44. Drive means 66 is provided for rotating auger unit 14 as well as reel 60, auger unit 14 being rotated in a direction to cause a crop within a trough 68 below auger unit 14 to be moved inwardly from the ends of trough 68 and toward impeller structure 12. As shown in FIG. 2, the back of the trough 68 has a central opening 70 and which is aligned with impeller structure 12. Deflector structure 74 is disposed rearwardly of a crop conditioner 72 to deflect a crop conditioned by the latter downwardly and rearwardly for deposit on the ground in the form of a windrow. A shield 76 overlies impeller structure 12 and prevents dust and chaff from being thrown upwardly as a crop is being fed through opening 70. Stripper bars 78 and 80 at the upper and lower sides of opening 70 prevent bunching and wrap-around of a crop on auger unit 14 as the latter rotates.

The vehicle 82 of machine 58 is driven by an operator by means of controls 84 so that conveyor 10, reel 60 and cutter bar 62 are moved together in a forward direction and toward a growing crop 86. A lean bar 88 spanning the distance between side supports 64 leans crop 86 forwardly so that the tines 90 on reel 60 will sweep the stems of the crop into a position to be cleanly cut by cutter bar 62. The crop is then projected upwardly along a ramp 92 by tines 90 and into trough 68. The crop is thus shifted transversely of the path of machine 58 and toward impeller structure 12 from the ends of trough 68 by the action of auger sections 18 and 20.

As auger unit 14 rotates to move the crop inwardly, the rows of tines 36 are shifted successively from their retracted positions to their crop-engaging positions and back to their retracted positions. Tines 36 move into their crop-engaging positions as they approach the bottom of trough 68 so that they will be disposed to penetrate the cut crop and force-feed the same toward and through opening 70. When tines 36 are at the bottom of auger unit 14, they are at their maximum outermost locations and they begin to move into their retracted positions as they start to move upwardly with auger unit 14. Tines 36 are cleanly and easily removed from the crop as they move into their retracted positions inasmuch as the tines continue to extend downwardly to a certain degree when they are in alignment with and pass opening 70.

Since tines 36 retract in the foregoing manner, trough 68 may be positioned closer to a crop receiver, such as conditioner 72, than has heretofore been possible with conventional conveyors in this field. In their retracted positions, the tines clear any adjacent structure so as to prevent any damage to such structure or to the tines themselves. Moreover, bearings 34 are out of the way of the crop as it is fed rearwardly so that there will be no binding action of the crop to foul bearings 34 and thereby prevent oscillation of shafts 32. Also, the crank structure for rotating shafts 32 is effectively isolated from the crop to prevent entanglement of the crop therewith.

Inasmuch as the swinging movement of tines 36 is responsive to the rotation of auger unit 14, no external source of power is required for rotating shafts 32. Furthermore, the swinging of shafts 32 is simplified by the use of stub shafts 50 which is common to all of the shafts 32.

If tines 36 encounter rocks, stumps and the like, the tines will deflect in a direction so as to clear such obstructions and then spring back to their normal positions. The operation of impeller structure 12 could continue even though a number of the tines 36 were deflected in this manner, or even if some of the tines 36 were permanently bent by the obstructions.

Having thus described the invention, what is claimed as new and desired to be secured by Letters Patent is:

In a crop handling unit for a farm implement:

an elongated cylinder having shaft means supporting the same for rotation about its longitudinal horizontally disposed axis, said cylinder having a plurality of longitudinally extending circumferentially spaced recesses, each recess opening radially outwardly of the cylinder, there being a pair of interconnected angularly offset walls within the cylinder defining the inner surfaces of each recess, respectively, each wall extending inwardly from the periphery of the cylinder in chord-like disposition;

a pair of spaced ends mounted in the cylinder for each of said recesses extending radially inwardly from said periphery, bearings in the recesses secured to each end respectively;

a swingable tine assembly in each recess respectively oscillatable with corresponding bearings; and crank means operably interconnecting the assemblies with the shaft means for oscillating the former upon rotation of the cylinder and its shaft means, one wall of each recess respectively having a slot for clearing a component of said crank means, the cylinder otherwise enclosing the crank means and being out of communication with said recesses.

References Cited by the Examiner

UNITED STATES PATENTS

| | | | |
|---|---|---|---|
| 2,608,283 | 8/1952 | Oehler | 198—9 |
| 2,717,690 | 9/1955 | Dukelow | 198—211 |
| 2,755,912 | 7/1956 | Ashton | 198—104 |
| 2,893,537 | 7/1959 | Krahn | 198—104 |

EVON C. BLUNK, *Primary Examiner.*

EDWARD A. SROKA, *Examiner.*